(12) United States Patent
Milvaney et al.

(10) Patent No.: US 12,399,925 B2
(45) Date of Patent: Aug. 26, 2025

(54) SYSTEMS AND METHODS TO SUMMARIZE CHANGE IN AN ELECTRONIC WORKSPACE

(71) Applicant: Microsoft Technology Licensing, LLC, Redmond, WA (US)

(72) Inventors: Douglas Lane Milvaney, Winchester, MA (US); Lyndsy Marie Stopa, Lancaster, NY (US); Jessica Samantha Mariscal Quintana, El Paso, TX (US); Natalie Ann Mionis, Brooklyn, NY (US); Manon Knoertzer, Boston, MA (US); Manish Kumar Shukla, Lexington, MA (US); Katie Nicole Rotella, Highland Park, NJ (US); Courtney Sarah Cochrane, Cambridge, MA (US); Yang He, Newton, MA (US); Yishuang Chen, San Francisco, WA (US); Michael Adam Scarpati, Wellesley, MA (US); Saniya Anvarovna Mazmanova, Seattle, WA (US); Ransom Lloyd Richardson, Acton, MA (US); Da Meng, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 18/184,267

(22) Filed: Mar. 15, 2023

(65) Prior Publication Data
US 2024/0311412 A1 Sep. 19, 2024

(51) Int. Cl.
*G06F 16/34* (2025.01)
*G06F 16/176* (2019.01)
(Continued)

(52) U.S. Cl.
CPC ......... *G06F 16/345* (2019.01); *G06F 16/176* (2019.01); *G06F 16/178* (2019.01);
(Continued)

(58) Field of Classification Search
CPC .... G06F 16/345; G06F 16/176; G06F 16/383; G06F 16/27; G06F 16/93; G06F 16/178; G06F 16/1873; G06F 16/9535
(Continued)

(56) References Cited

U.S. PATENT DOCUMENTS

| | | | |
|---|---|---|---|
| 9,679,006 B2 * | 6/2017 | Wright | G06F 16/2237 |
| 2014/0032471 A1 * | 1/2014 | Reddy | G10L 15/22 |
| | | | 706/47 |

(Continued)

OTHER PUBLICATIONS

Anonymous: "Workspace", Wikipedia, accessed on link https://en.wikipedia.org/w/index.php?title=Workspace&oldid=1073034117, Published on Feb. 20, 2022, retrieved on May 24, 2024, 4 pages.
(Continued)

*Primary Examiner* — Shahid A Alam
(74) *Attorney, Agent, or Firm* — Novo TechIP International PLLC

(57) ABSTRACT

A data processing system includes: a processor; a network interface; and a memory comprising programming instructions for execution by the processor to: access an electronic workspace; determine a list of changes to the workspace within a period of time; structure a query to a Large Language Model (LLM) or Artificial Intelligence (AI) engine, the query to generate for a user a summary of the changes; obtain a corresponding summary from the LLM or AI engine; and in a user interface, associate a display of the workspace with the corresponding summary to update a user as to a current state of the workspace.

15 Claims, 9 Drawing Sheets

(51) Int. Cl.
| | |
|---|---|
| *G06F 16/178* | (2019.01) |
| *G06F 16/18* | (2019.01) |
| *G06F 16/27* | (2019.01) |
| *G06F 16/383* | (2019.01) |
| *G06F 16/93* | (2019.01) |
| *G06F 16/9535* | (2019.01) |

(52) U.S. Cl.
CPC .......... *G06F 16/1873* (2019.01); *G06F 16/27* (2019.01); *G06F 16/383* (2019.01); *G06F 16/93* (2019.01); *G06F 16/9535* (2019.01)

(58) Field of Classification Search
USPC ....................................................... 707/769
See application file for complete search history.

(56) References Cited

U.S. PATENT DOCUMENTS

| | | | |
|---|---|---|---|
| 2018/0068031 A1* | 3/2018 | Hewavitharana | ... G06F 16/3329 |
| 2022/0382728 A1 | 12/2022 | Religa | |
| 2022/0405343 A1* | 12/2022 | Thadani | ................ G06F 16/345 |

OTHER PUBLICATIONS

International Search Report and Written Opinion received for PCT Application No. PCT/US2024/018583, Jun. 5, 2024, 13 pages.

\* cited by examiner

SYSTEMS AND METHODS TO SUMMARIZE CHANGE IN AN ELECTRONIC WORKSPACE

BACKGROUND

Any variety of data and documents can be stored in electronic form. Cloud-based data storage can provide a user with a much larger data store than is typically available locally on a user's personal computer or workstation. Networking and cloud storage also provide for the rapid sharing of data and documents anywhere around the globe. If the data is stored in the cloud, two or more different users may readily access the same file or files online to read, edit or expand an electronic document or workspace. In some applications, multiple users may be able to collaborate by seeing and editing the same document at the same time on different respective devices.

With this ability to have multiple authors or editors to an electronic workspace greatly improves collaboration, it may be challenging to any one user to keep track of the changes being made and the evolution of the document or workspace. For example, a user may return to an electronic document or workspace after some period of time in which other users have made changes to the data. The user may want to understand quickly what changes have been made, but may have difficulty determining what has changed.

SUMMARY

In one general aspect, the instant disclosure presents a data processing system that includes: a processor; a network interface; and a memory comprising programming instructions for execution by the processor to: access an electronic workspace; determine a list of changes to the workspace within a period of time; structure a query to a Large Language Model (LLM) or Artificial Intelligence (AI) engine, the query to generate for a user a summary of the changes; obtain a corresponding summary from the LLM or AI engine; and in a user interface, associate a display of the workspace with the corresponding summary to update a user as to a current state of the workspace.

In another aspect, the instant disclosure presents a non-transitory computer-readable medium having programming instructions for execution by a processor, the instructions, when executed, causing the processor to: access an electronic workspace in cloud storage using a network interface; determine a list of changes to the workspace within a period of time; structure a query to a Large Language Model (LLM) or Artificial Intelligence (AI) engine, the query to generate for a user a summary of the changes; obtain a corresponding summary from the LLM or AI engine; and in a user interface, associate a display of the workspace with the corresponding summary to update a user as to a current state of the workspace.

In another aspect, the instant disclosure presents a method of tracking development in an electronic workspace that is shared by multiple users, the method including, with a processor of a user device: accessing an electronic workspace in cloud storage using a network interface; determining a list of changes to the workspace within a period of time; structuring a query to a Large Language Model (LLM) or Artificial Intelligence (AI) engine, the query to generate for a user a summary of the changes; obtaining a corresponding summary from the LLM or AI engine; and in a user interface, associating a display of the workspace with the corresponding summary to update a user as to a current state of the workspace.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
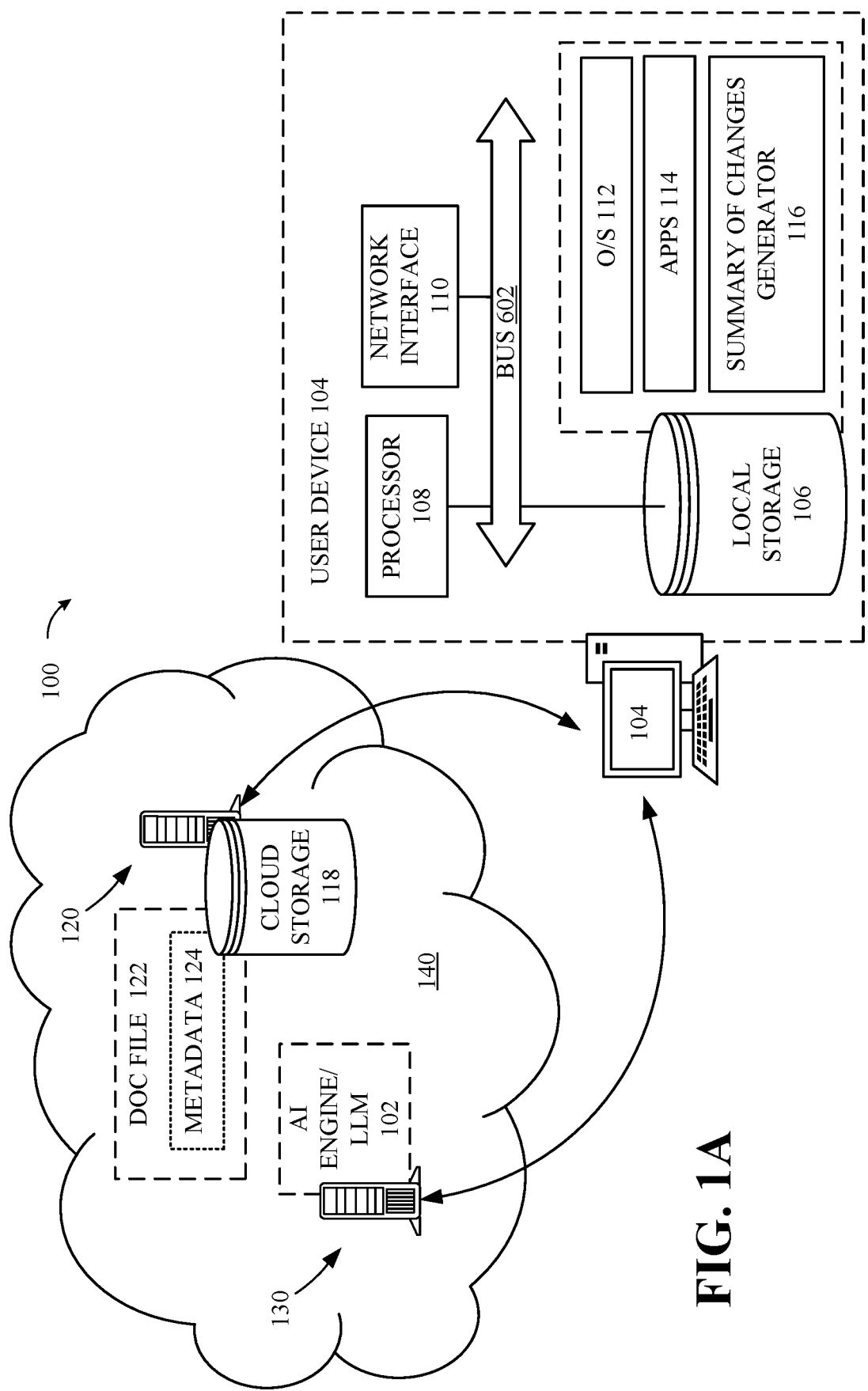
FIG. 1A depicts an example system upon which aspects of this disclosure may be implemented.

As noted above, electronic data is infinitely malleable. Data stored in electronic form is subject to easy editing, rearrangement, expansion, etc. This may include multiple users working on the same file or files of data. With this ability to have multiple authors or editors to an electronic workspace, it may be challenging for any one user to keep track of the changes being made and the evolution of the document or workspace. For example, a user may return to an electronic document or workspace after some period of time in which other users have made changes to the data. The user may want to understand quickly what changes have been made but may have difficulty determining what has changed. In another scenario, a user may be editing a document or workspace and may want to have a summary of the changes they have been made to send to another user who will need to be aware of the evolution of the project.

Accordingly, the present specification describes systems and methods to summarize change in an electronic workspace. In various examples, this is done by utilizing an Artificial Intelligence (AI) engine or Large Language Model (LLM) to generate a change summary based on the changes that have been made. A particular structure of the input to the AI or LLM, as described herein, facilitates obtaining a meaningful and focused summary of the changes.

As used herein and in the appended claims, the term "workspace" or "electronic workspace" will be defined as an underlying set of data that can be accessed by one or multiple users as a unified project within an application. In a simple example, a workspace is an electronic document that may include text and/or graphics. Such an electronic document can be stored where it is accessible to multiple users for review and editing. In more complex examples, a workspace may be a collection of related documents and/or other content such as spreadsheets, tables, graphs, images, photographs, audio or video data or any other form of content.

As a workspace evolves through user efforts, the ability to summarize what change has taken place can be valuable in a wide variety of scenarios. These scenarios include: (1) coming up-to-speed on the important team/project progress when returning to a workspace (Workspace Status Summary), (2) recapping recent changes so as to provide context to teammates (Recap), and (3) getting quick overviews of written content, such as the current page or changes since a user last visited (Tl;dr) (Too long; didn't read).

In addition to summarizing content changes (e.g., a delta between state A and state B), the summarization described herein can additionally account for metadata about the changes such as who made the changes, when the changes were made, and unique and novel data types that the changes reference, e.g., in-line status, comments, reactions, etc. The changes summarized can also include other changes beyond content changes, for example, person A updated foo to bar. Summaries can also account for more rich data type details such as when person B changes the status on page one from "in-progress" to "ready to review"). In some scenarios, the system may use filters controlled by the user to only look at a set of specific changes about rich data types. Any of this metadata can also be paired with data or signals already in the workspace such as organization info, relationships, related work and projects, etc. This additional data allows the system described to craft rich summaries. This approach further enables a whole set of collaborative capabilities where a user can ask the system questions and refine the resulting summaries using customer-facing language to answer the most pressing issues. Additionally, the approach described smartly identifies different moments or scenarios where summaries are helpful and suggests the right experiences and default prompts to help generate the right summary for that situation.

Aspects of the approach being described herein include the following: The ability to summarize changes over time and not just the current page content. The system maintains a record of the content being summarized so the user can navigate back to the content underlying the summary, for example, to get more details, check what is being referenced, etc. The system understands metadata about the changes (e.g., who made the change, when the change was made, rich data types, etc.). This results in improved summaries (e.g., Kat and Mike contributed 90% of the changes in the last day where they focused on making the conclusion more professional). The system also identifies moments when a summary may helpful and steers the user to the right experience with some pre-prompting for that scenario (e.g., if the user just made a lot of changes to a workspace, the system may suggest that the user recap those changes by producing a summary of the changes). This might be done by the system providing for the user a recap-centric user interface or experience (vs. simply returning to a workspace) and suggesting the user see the progress updates.

The described approach also blends existing signals and data in the workspace substrate with passing in key context that is only available during the editing session (what the changes are, what the content was before, who made the changes, etc.). The system understands more than just plain-text changes but also details about rich data types and signals (e.g., task was assigned from Mike to Kat and the due date was updated; the page status changed from ready to review to complete). The system can summarize over different altitudes (e.g., this page, this workspace, all my workspaces, etc.) The described system can leverage existing AI engines and LLMs as well as more bespoke models for fallback when capacity might be low.

FIG. 1A depicts an example system upon which aspects of this disclosure may be implemented. As described above, an electronic workspace can be opened by users in an application for reading or editing. Multiple users may be collaborating on the same workspace. Physically, a user will access and operate on an electronic workspace using a user device 104. As shown in FIG. 1A, a user device 104 could be a personal computer of any type, a workstation, a mobile computing device or other computing device with a network interface 110 for communicating data via a network or cloud 140.

As also shown in FIG. 1A, the user device 104 may include a processor 108 and a local data storage 106. The processor 108 may be or include any number of processors 610 or processing cores working in tandem. The local data storage 106 may be or include a hard drive, solid-state drive, flash memory, Random Access Memory (RAM), a disc array or any other form of electronic data storage. The processor 108 and local storage 106 are connected via a data bus 602. The bus 602 also provides communication for the processor 108 with the network interface 110. Through this network interface 110, the user device 104 can communicate with other devices via the network or cloud 140.

The local storage 106 will contain different types of programming instructions, applications, programs, software, firmware and data files. As shown in FIG. 1A, the local storage 106 will also store an operating system (O/S) 112 for execution by the processor 108. Although not specifically illustrated, this will include a Basic Input Output System (BIOS), drivers and firmware needed to operate the user device 104.

A number of applications or programs 114 are also contained in the local storage 106. Applications 114 are executed on the O/S after the O/S is executing. Many of the applications 114 will include a user interface with which a user can read or work on an electronic workspace. Examples of such applications including word processing applications, browsers, email applications, spreadsheets, presentation or collaboration applications, and many others. The user interfaces of such applications will accept and mirror text that is typed by the user on a keyboard or otherwise input to the user device 104. These user interfaces will also include tools for editing the written text that has been input.

According to the present application, the local storage 106 of the user device 104 will also include a "summary of changes" generator 116. This generator may be a native feature incorporated into an application 114, as described above, or may be implemented as a plug-in or add-in for one of the applications 114.

A plug-in or add-in is a software component that adds specific functionality to an existing software application. Plug-ins and add-ins are usually created to extend the capabilities of the host application, without requiring users to purchase a new, standalone software program. They can add new features, enhance existing ones, or customize the behavior of the software in some way. In general, plug-ins and add-ins are designed to be easily installed and uninstalled, so users can choose to add or remove specific features based on their needs.

Thus, whether a native component of an application or a plug-in or add-in, this generator 116 will add to a respective application the functionality described herein of being able track and summarize changes to an electronic workspace. For example, the generator 116 can support an application in providing any of the user interface elements illustrated and described in any of FIGS. 3 and 4 and others. Additionally, the generator 116 can implement for any respective application the features and flows illustrated in any of FIGS. 1B and 2 and others.

In general terms, the generator 116 will allow an application to obtain a summary of the changes in an electronic workspace under a variety of different scenarios utilizing an AI engine or LLM 102. In the example of FIG. 1A, the AI/LLM 102 is implemented on a server 130 that is accessible to the user device 104 via the network or cloud 140. The AI engine 102 can be any artificial intelligence or Large Language Model (LLM) that is trained to provide a summary of electronic content, including specifically in changes that have been implemented in an electronic workspace when properly queried to do so. In an example, the AI/LLM 102 may be GPT-3 or ChatGPT.

GPT stands for "Generative Pre-trained Transformer." It is a type of large-scale neural language model developed by OpenAI that uses deep learning techniques to generate natural language text. GPT models are pre-trained on large datasets of text, allowing them to learn patterns and relationships in language and then generate new text based on that learning. GPT models have been trained on a wide range of text, from web pages to books, and can be fine-tuned for specific tasks, such as question answering, summarization, and translation. They have been used in a variety of applications, including chatbots, language translation, and text generation for creative writing and content creation.

GPT-3 is the third generation of the GPT (Generative Pre-trained Transformer) language model developed by OpenAI, which is currently one of the largest and most powerful language models available. It has been pre-trained on a vast amount of text data and can generate high-quality natural language text, including articles, stories, and even computer code. GPT-3 has 175 billion parameters, making it several orders of magnitude larger than its predecessor, GPT-2. ChatGPT, on the other hand, is a variant of GPT that has been specifically fine-tuned for conversational tasks, such as chatbots and dialogue systems. ChatGPT has been trained on a large corpus of conversational data and can generate responses to user input in a way that simulates natural conversation.

The main difference between GPT-3 and ChatGPT is their respective training data and the specific tasks they are designed for. While GPT-3 is a general-purpose language model that can perform a wide variety of language tasks, ChatGPT is focused on conversational applications and has been fine-tuned specifically for that purpose. This means that while GPT-3 may perform well on a variety of language tasks, ChatGPT is likely to perform better on conversational tasks specifically. A variety of existing AI engines or LLMs can be employed according to the principles described herein. Future improvements to or later-developed AI engines/LLMs may also be used in implementing the principles described herein.

In an example, the system 100 of FIG. 1A may operate or be operated as follows. In this example, an electronic workspace exists in the form of a document for which a document file 122 is stored on a server 120 in the cloud 140. Because of its location in the cloud 140, this document file 122 may be accessed by a number of different users from their respective user devices 104. A first user may open an application 114 on a user device 104 and access the document file 122. In a resulting editing session, the first user can make changes to the document file 122 and save the revised document file 122 to the cloud storage 118. A number of users may do the same over a period of time.

Later, a second user may open the corresponding application on a respective user device and access the document file 122. Since the second user last viewed the document file 122, any number of other users may have made changes. In the present example, the document file 122 includes metadata 124 that is stored with the file 122 by the application 114. This metadata can include a record of the changes made to the document, who made the changes, when the changes were made, etc.

In this illustrative scenario, the second user wants a summary of the changes that have been made. Consequently, as will be described in more detail below, the "summary of changes" generator 116 can be invoked by the user. With the generator 116, the user selects an option for a summary of changes since the second user last opened the document file 122 or over a specific range of time designated by the user. Using the metadata 124 in the file 122, the generator 116 will prepare a query to the AI/LLM 102. This query may be in natural language and include a list of the changes recorded in the metadata 124 since the last time the second user opened the file 122 or within the specified time period. The query may also include the metadata specifying what user made each respective change, etc. With this collected metadata, the generator 116 queries the AI/LLM 102 for a summary of the changes to the document (or workspace) 122 that have occurred since the second user last opened the file 122.

The AI/LLM 102 will then return the requested summary to the user device 104. The summary can be posted in the user interface of the application 114 that is utilizing the generator 116 to quickly appraise the user of what has happened in the workspace since the user last visited, including possibly which other user or users have made the changes and in what respective amounts or locations. For example, the summary can specify that the first user made all of, the bulk of, or a percentage of the changes. For example, the summary can specify that a third user made changes to one or more specific portions of the workspace. The summary may also indicate an apparent objective in the changes made.

In another scenario, the first user may be editing the document file 122 in an application 114 on the user device 104. The generator 116 may capture a record of the changes made by the user to the file 122. For example, the generator may store multiple versions of a paragraph of the document file 122 at different points of time during the editing.

After editing the file 122, the user may want to generate a summary of the changes made to send as a notice to other collaborating users or to otherwise post or record. In this case, the user interface provided by the generator 116 will provide an option for the user to generate a summary of the editing session or a specific portion thereof. When the user activates this option, the generator 116 can utilize its records of the editing session to, again, generate a list of changes and related information to be submitted in a query to the AI/LLM 102 for summarization. In this scenario, the generator 116 may use only its own change records or may also utilize the metadata 124 being stored in the document file 122.

Additionally, the generator 116 may have a user interface that allows the user to send the generated summary to a specific other user along with a request for follow up or a task assignment related to the summary of the workspace. The generator 116 may keep a record of this message and assignment to assist with following the task to completion.

In still another scenario, the user may find that a substantial amount of content has been added to the document file 122 when it is next accessed. The user may want a quick summary of the substantial new content e.g., a TL;dr summary, without necessarily being interested in what changes may have been made to this content since its creation, if any. In this scenario, the generator 116 provides a user interface with which the user can indicate the portion of the workspace for which the user wants a summary of the content itself. The system packages the indicated content in a query to the AI/LLM 102 for a summary. This query can be in natural language. The resulting summary is then posted for the user in the user interface of the application 114/generator 116.

Lastly, the generator 116 may prompt the user in the user interface as to whether a summary is desired based on detecting any of the scenarios described above. Thus, the generator 116 can remind the user of the ability to generate any of a summary of changes since the workspace was last viewed, a summary of the user's own changes at the end of an editing session and a summary of content that the user may not want to take the time to read at the moment.

Figure 1B:
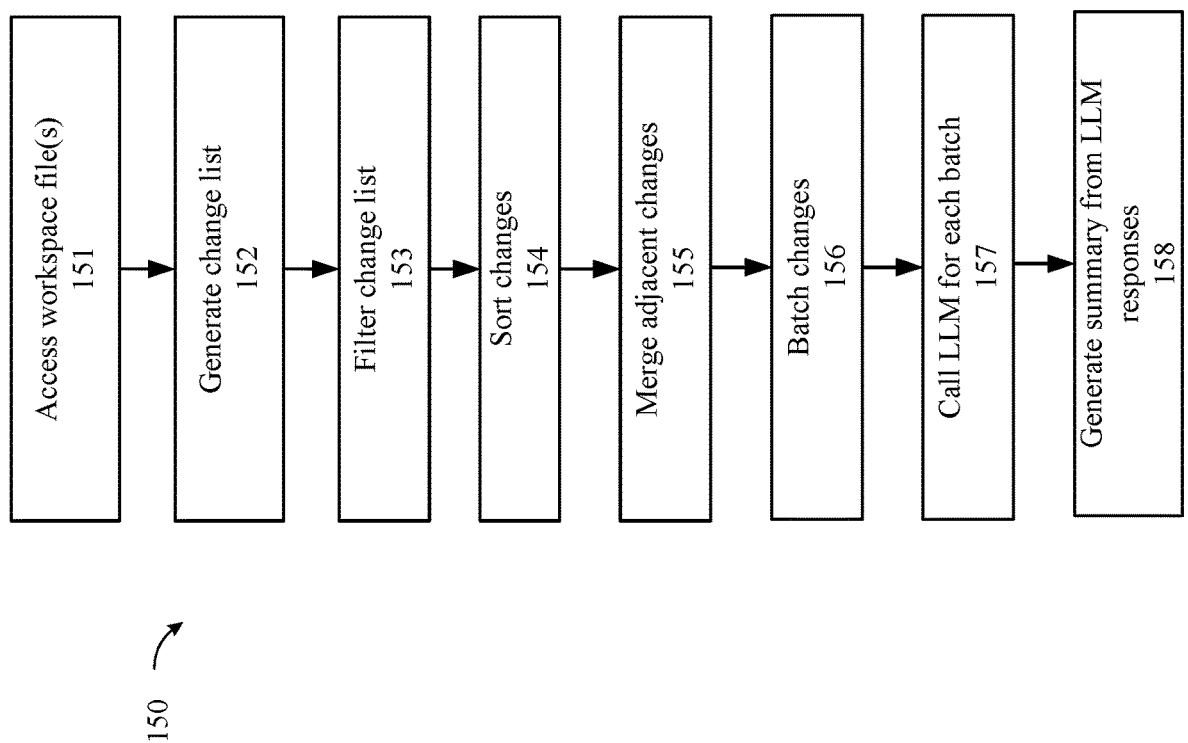
FIG. 1B depicts a flow diagram of an illustrative method of generating a change summary according to aspects of this disclosure.

FIG. 1B depicts a flow diagram of an illustrative method of generating a change summary according to aspects of this disclosure. As shown in FIG. 1B, the method begins with accessing 151 the electronic workspace using a relevant application. This means accessing the file or files that contain the data or content of the workspace. As described in FIG. 1A, this could simply be a document file or could be any other type of content file or files that define the workspace.

Next, the method generates 152 a change list of the changes that have occurred in the data or content of the workspace. This may be relative to a previous time that the current application or user opened the workspace. Alternatively, it may be with respect to a specific point in time that the user is able to specify via the generator 116 (FIG. 1A).

Next, the method filters 153 the change list. As will be described in more detail below, the method applies one or a series of filters to eliminate changes from the change list that may not contribute to a meaningful summary of the changes as a whole. The method may then sort the changes 154. For example, the remaining changes may be sorted into an order in which they appear in the workspace. Thus, the resulting summary can consider together changes made to a single portion of the workspace. Alternatively, the changes may be sorted by when they occurred to provide a more temporal summary of the change history.

Next, adjacent changes are merged 155. This may mean that changes of the same type or that are in close proximity are considered together. The resulting list of merged changes may then be batched 156. This means that not all change records in the list are submitted for summarization by the AI/LLM in a single query. Rather, several batches of changes may be submitted 157 and each receive a respective batch summary. A final overall summary may then be generated 158, for example, by compiling or concatenating all the batch summaries or by submitting the batch summaries to the AI/LLM as a query requesting an overall summary be produced therefrom.

Figure 1C:
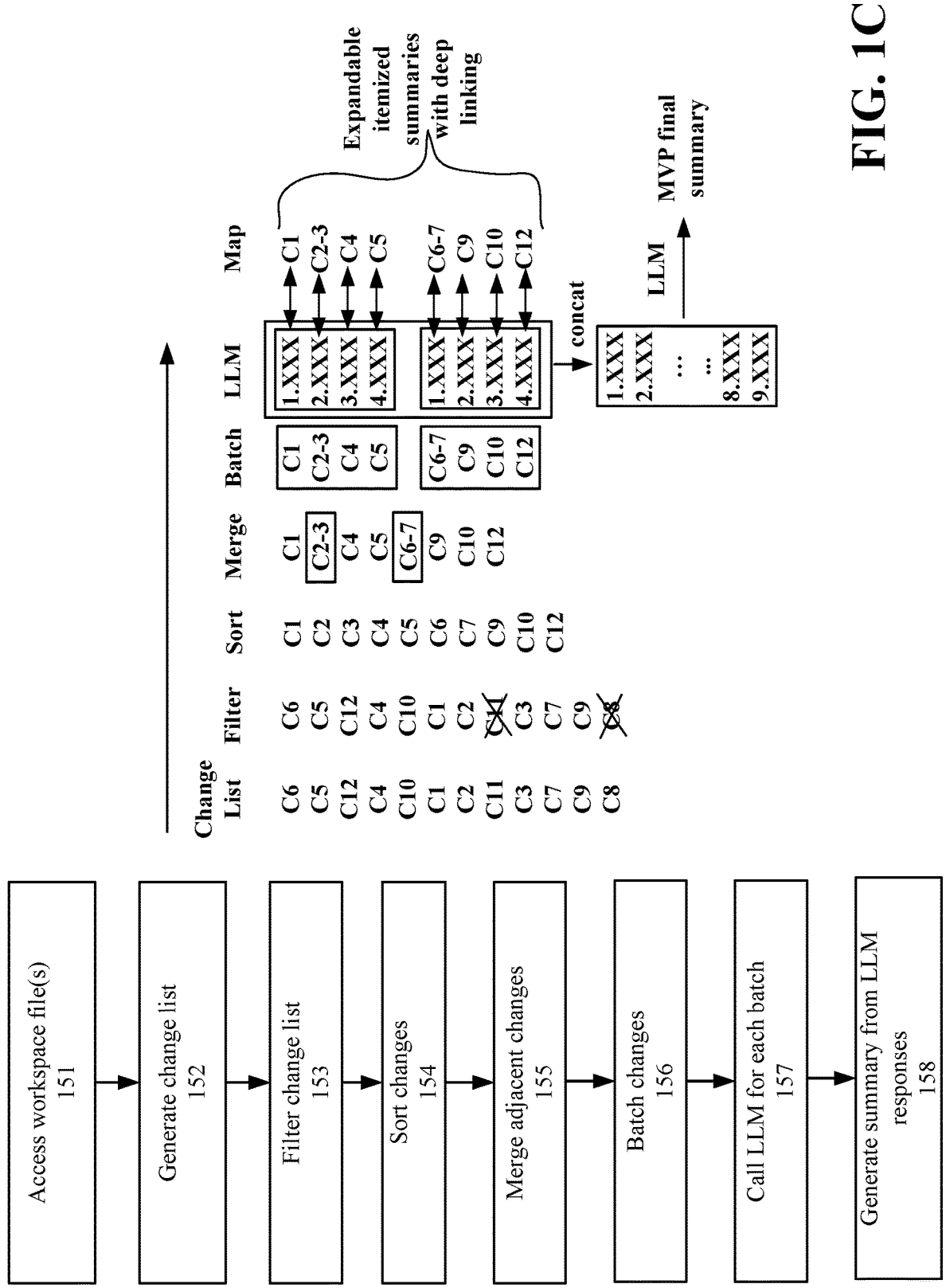
FIG. 1C illustrates the flow diagram of FIG. 1B along with a table showing an example of the data being processed.

FIG. 1C illustrates the flow diagram of FIG. 1B along with a table showing an example of the data being processed. In the table portion of FIG. 1C, the first column illustrates a change list with changes represented as items C1-C12. In the second column, a number of filters are applied and three of the changes are discarded as a result. In the third column, the changes are sorted into a specified order, as described above. In the fourth column, some of the changes are merged. For example, C2 and C3 are henceforth considered a single change in the change list. The same applies to C6 and 67.

Next, in the fifth column, the list of changes is divided into two batches. Each batch is then used to form a query to the AI/LLM. For example, the changes and relevant metadata for those changes of each batch are submitted to the AI/LLM along with a request that the information be summarized. This query may be in natural language.

In the sixth column, the AI/LLM has returned two summaries, one for each batch. These summaries may be itemized, for example, divided into separate statements or logical thoughts. The query will have requested that the summary be presented in this format. A map is then created that associates the items in the summary with the respective changes being summarized. Links to the corresponding portions of the workspace may be added into the summary based on this map. A final overall summary may then be generated, for example, by compiling or concatenating all the batch summaries or by submitting the batch summaries to the AI/LLM as a query requesting an overall summary be produced therefrom.

Figure 2:
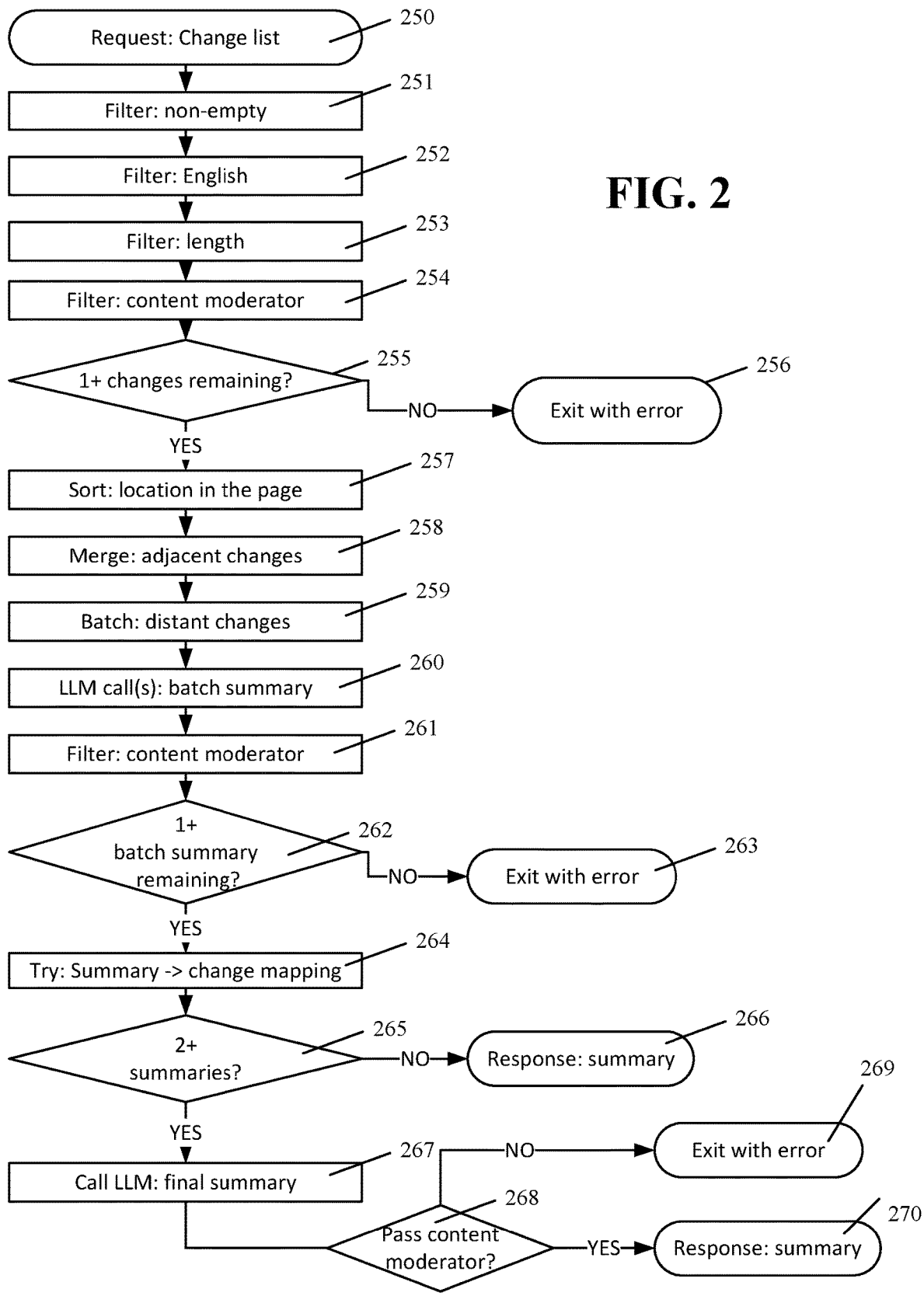
FIG. 2 depicts a flow diagram of an illustrative method of generating a change summary according to aspects of this disclosure.

FIG. 2 depicts a flow diagram of an illustrative method of generating a change summary according to aspects of this disclosure. The flow in FIG. 2 is similar to that of FIG. 1B but adds additional details. Either of these methods may describe the operation of the generator 116 in FIG. 1A.

As shown in FIG. 2, the method begins with requesting or generating 250 the change list. Next, the list is filtered. For example, a first filter 251 may verify that the change list is not empty and contains at least one change. If the change list does not include some minimum number of changes, the generator may notify the user of this finding. At that point, the user may prefer simply to look at the brief list of changes rather than needing a summary as would be the case with a larger list of changes.

Another filter may determine if the changes are in an appropriate language 252. If the changes are not in a language for which the AI/LLM is trained, a meaningful summary will not result. Another filter may check the length of the changes 253. Changes recorded with or referencing too much data may also hinder the AI/LLM from producing a meaningful summary. Finally, a filter may check content 254. For example, the generator described above may have a list of terms that refer to or identify content that is sensitive and which the user may not want to possibly appear in a summary that might be distributed beyond the user's control. This may range, for example, from confidential information internal to an organization to simply content that someone may consider inappropriate.

After this filtering, the method will determine if there are any changes remaining 255. If not, the method will end 256. Assuming there remains a list of changes, the method will sort the changes 257, for example, by location on the page or within the workspace. In some examples, the sorting refers to sorting all changes based on their path. After sorting, the recap presents change summaries in the same order as those changes located on the page.

The method will then merge adjacent changes 258. For example, this merging is to merge adjacent changes if they should be summarized as a single block because they are of the same entity type, same parent path or not too long. Merging concatenates content from multiple changes, reducing the number of changes, but not cutting the content being summarized.

Next, the changes are batched 259, i.e., batching groups of changes to summarize them in a single call to the LLM. This decreases the time required as compared to if every change needs a call to the LLM. Summarization quality may be degraded if there are too many changes to the workspace listed in a single call to the LLM. Thus, batching is about finding the balance between number of calls and summarization quality. The method then calls the AI/LLM for each batch with a query for a summary as described above. If, for some reason, no summaries are returned, the method ends 263.

For summaries that are returned, a map is created 264, as described above, that associates items or statements in the summaries with a respective change or changes being described or summarized. With batch summarization, every generated summary corresponds to a list of changes rather than a single change. Explicit instructions may be given to the LLM to summarize the changes in their original order one by one and output a numbered list. This creates an itemized change summary and enables the mapping between summary and underlying changes.

If there are only two batches and two summaries 265, as in the table in the example above, the two summaries may be concatenated into a final summary which is then posted 266. However, if there are more than two summaries, another call to the AI/LLM is made 267 requesting an overall summary based on the batch summaries. This overall summary may also be reviewed or filtered for content 268. Again, this may be to remove inappropriate language, sensitive subjects, etc. This may also include a check of the summary against the changes or workspace content as a confirmation that the AI/LLM has operated accurately. If the overall summary does not pass this final check, the method may exit 269. Alternatively, the overall summary is posted 270 for the user.

Figure 3:
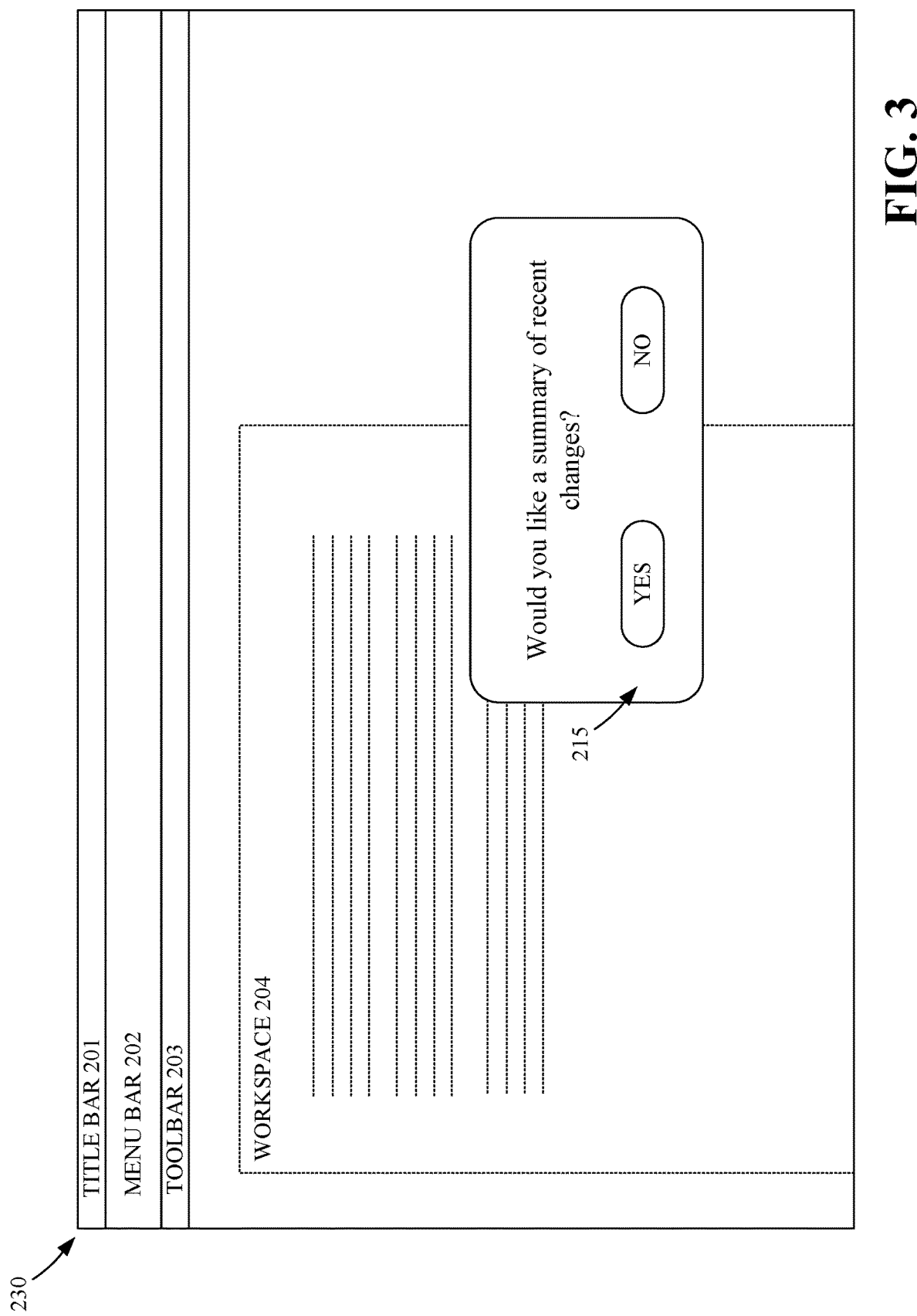
FIG. 3 depicts a portion of a user interface in a system upon which aspects of this disclosure may be implemented.

FIG. 3 depicts a portion of a user interface in a system upon which aspects of this disclosure may be implemented. As shown in the example of FIG. 3, an application with a user interface 230 has been used to open the content of the workspace 204. In general, the application may have such elements as a title bar 201, a menu bar 202 and a toolbar 203 above the window in which the content of the workspace 204 is displayed.

Upon the occurrence of a specified triggering event, a popup 215 may be displayed in the workspace canvas to remind the user that a summary of changes to the workspace can be generated. For example, when the user first opens the file(s) for the workspace, the application may note how long it has been since the user last visited the workspace. If this time exceeds a threshold, the popup 215 may be invoked. Alternatively, the application may note the metadata of the electronic workspace file to determine a quantity of changes made to the workspace within a defined period of time or since the user last visited the workspace. If either exceeds a threshold, the application may again invoke the popup 215. Alternatively, when the user finishes editing the workspace, the application may invoke the popup 215 to see if the user wants to generate a summary of the changes he or she has made to the workspace. In response to the popup 215, the user can either select the option to generate the summary or not. If the summary generation is instructed, the flow of FIG. 1B or FIG. 2 or another summary generation flow is implemented.

Figure 4A:
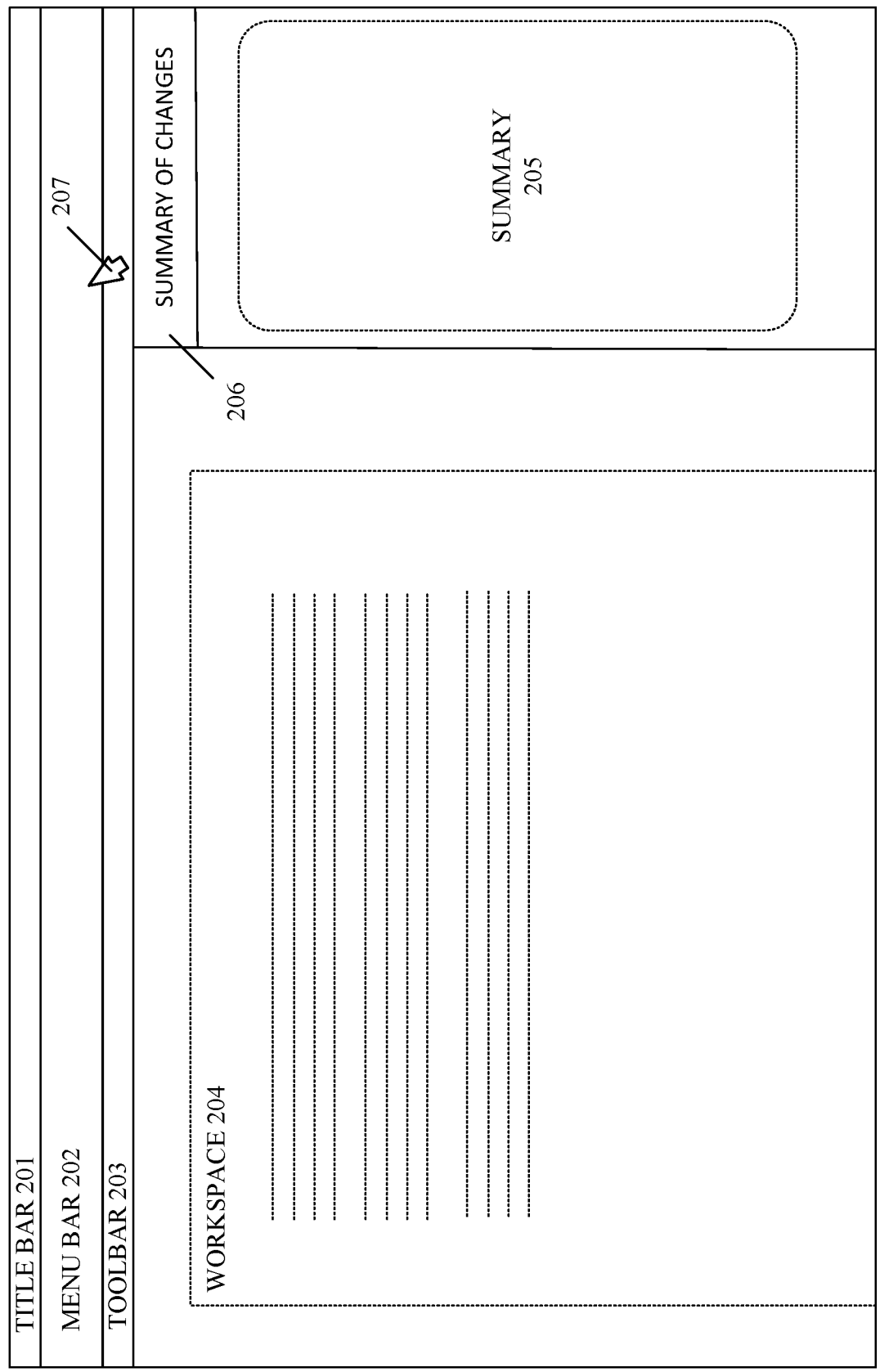
FIG. 4A depicts a portion of a user interface in a system upon which aspects of this disclosure may be implemented.

FIG. 4A depicts a portion of a user interface in a system upon which aspects of this disclosure may be implemented. As shown in FIG. 4A, a mouse cursor 207 may be used to access the menu bar 202 or toolbar 203 to invoke the generation of a summary. Thus, without a triggering event, the user can access controls that will invoke the generator to produce a summary in any of the scenarios described herein. The summary can be produced over any subset of changes within the workspace, for example, over a single page, specific blocks of content within a page or a range of pages.

Also shown in FIG. 4A, the "SUMMARY OF CHANGES" pane 206 that has been added to the user interface in response to a summary being generated. This pane 206 may be adjacent to the workspace canvas 204 and includes the summary or summaries 205 produced as described above or otherwise. In some examples, this pane 206 may simply be a TL;DR summary rather than a summary of changes. In that case, the mouse cursor 207 may have been used to designate the portion of the workspace 204 to be summarized, as described above. This user interface may also include tools for the user to directly edit the summary provided or ask follow-up questions (aka refiners, prompts) to adjust or improve the generated summary. This could be for a specific use case such as sharing the summary with others (e.g., the user edits the summary to add a little introduction or contextual setting before sharing with the summary with another user) or to improve the user's own analysis or understanding (e.g., the user asks the system to focus more on updates concerning topic X or to focus on edits or changes that person Y has made).

Figure 4B:
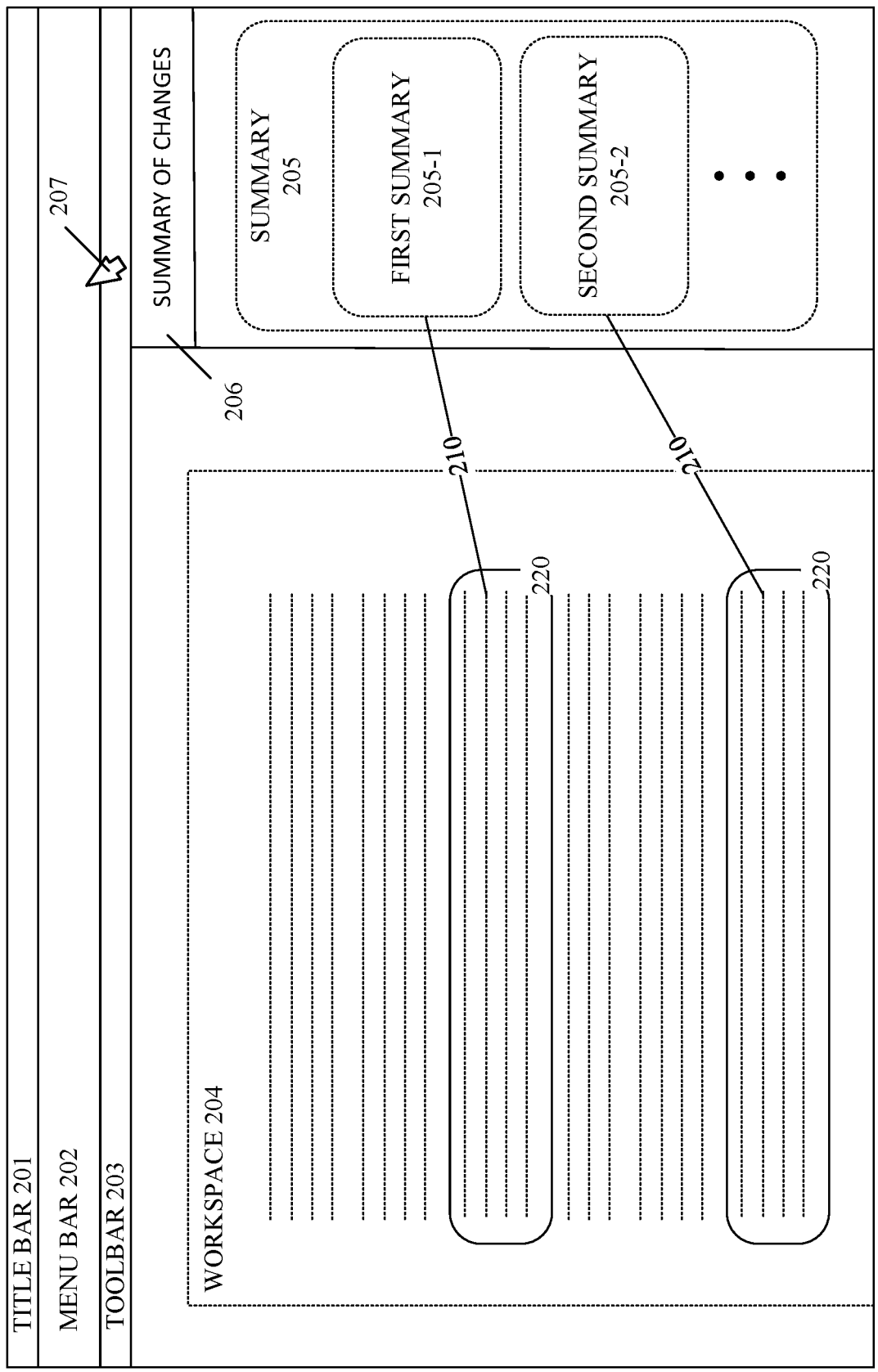
FIG. 4B depicts a portion of a user interface in a system upon which aspects of this disclosure may be implemented.

FIG. 4B depicts a portion of a user interface in a system upon which aspects of this disclosure may be implemented. As shown in FIG. 4B, different summaries 205 or summary items may be displayed the pane 206. For example, a coherent portion of the workspace 204, such as a paragraph or section 220, may have all the changes therein summarized in a first summary 205-1. The portion 220 of the workspace may be highlighted and connected by a display element 210 to the first summary 205-1. For example, the first summary 205-1 may specify that, in the corresponding portion of the workspace, another specified user edited the first and third sentences for a more logical flow. A second summary 205-2 may be similarly associated with a different corresponding portion of the workspace 204. Any number of summaries may be provided for different portions of the workspace.

Figure 5:
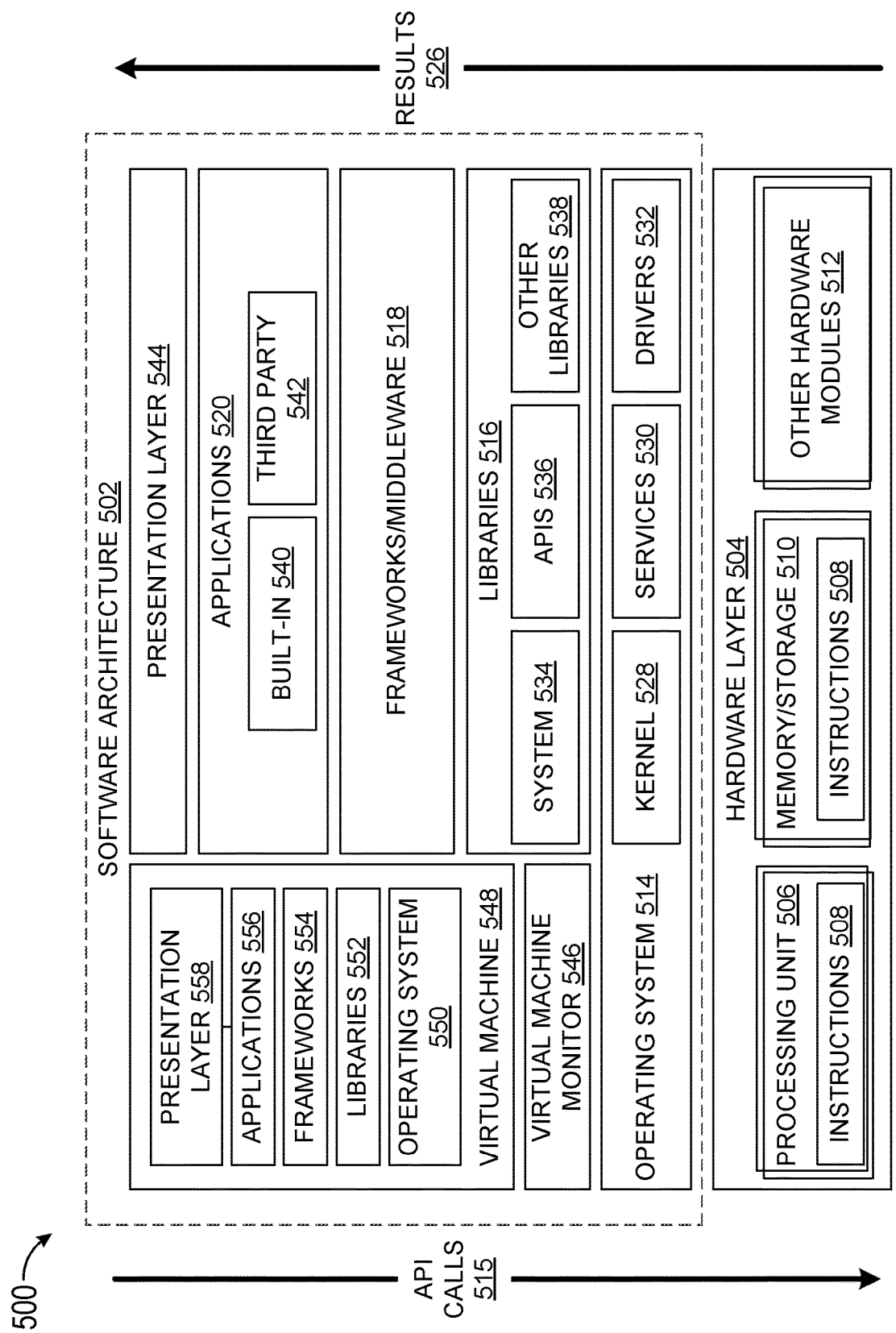
FIG. 5 is a block diagram illustrating an example software architecture, various portions of which may be used in conjunction with various hardware architectures herein described.

FIG. 5 is a block diagram 500 illustrating an example software architecture 502. This software architecture can be part of a system, as described, herein for generating a summary of changes to or a new portion of an electronic workspace using an AI/LLM. Various portions of this illustrated software architecture may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 515 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
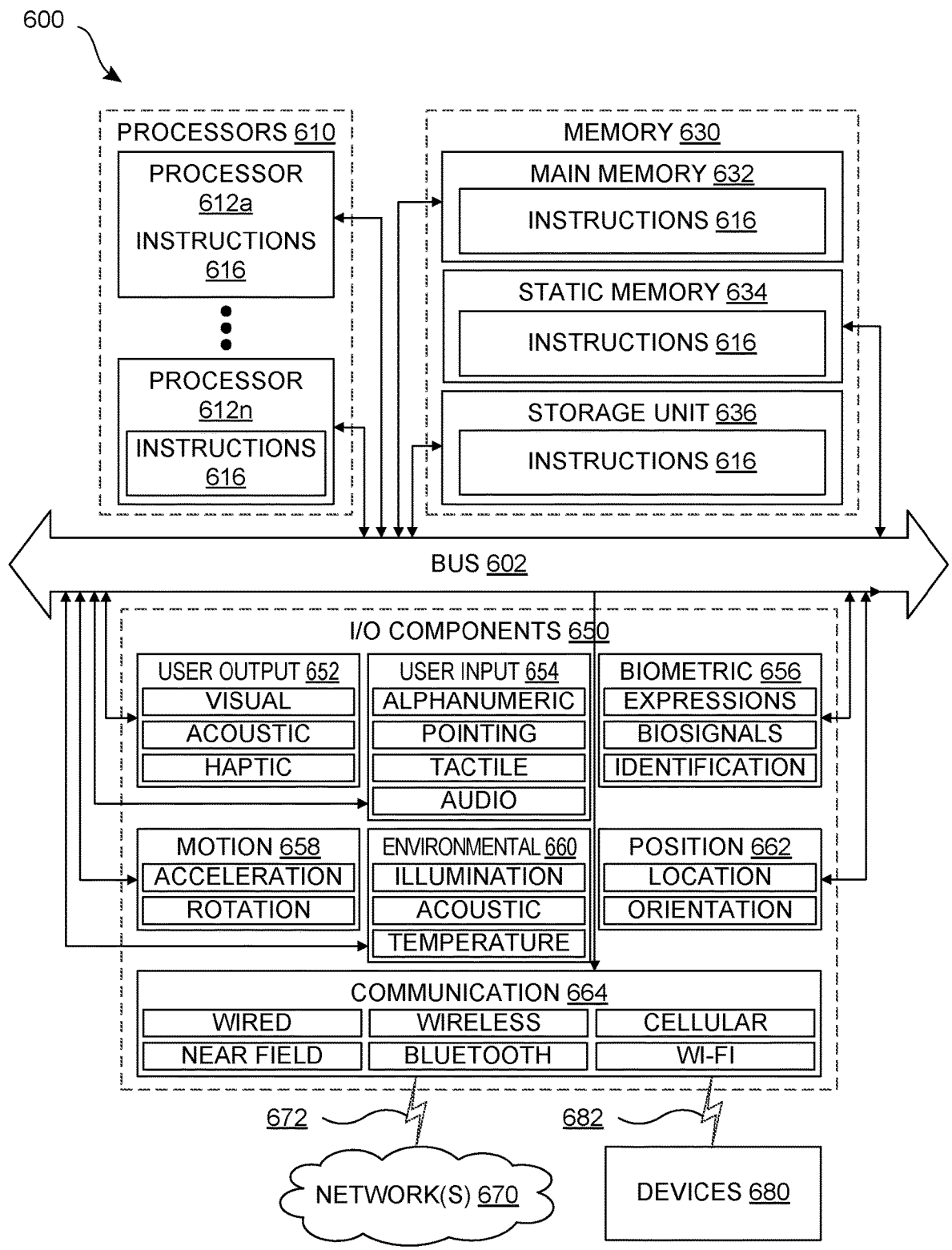
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. This example machine can be part of a system, as described, herein for generating a summary of changes to or a new portion of an electronic workspace using an AI/LLM.

The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP)

address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In summary, the methods and systems described above related to collaboration and improved document change tracking system that provides for summarizing content changes along with metadata about the changes, e.g. who made the changes and when, along with rich data types that may include in-line status, comments, and reactions. Additional metadata that can be included in the summary may include entity data such as organization info, relationships among users, and related projects. The system adapts the type and content of the generated summary to different scenarios that at are identified, such as 'come up to speed' with a work status summary, recap recent changes to provide summaries and context around changes, and condensed summaries of content where changes were made. An aspect includes the system as described according to a high level architecture diagram including the detailed interaction with a generative AI model such as GPT to enable the functionality described above and in sufficient detail to support the invention as a technical solution.

In the following, further features, characteristics and advantages of the invention will be described by means of items:

Item 1. A data processing system comprising:
a processor;
a network interface; and
a memory comprising programming instructions for execution by the processor to:
access an electronic workspace;
determine a list of changes to the workspace within a period of time;
structure a query to a Large Language Model (LLM) or Artificial Intelligence (AI) engine, the query to generate for a user a summary of the changes;
obtain a corresponding summary from the LLM or AI engine; and
in a user interface, associate a display of the workspace with the corresponding summary to update a user as to a current state of the workspace.

Item 2. The system of Item 1, wherein the workspace comprises metadata capturing a record of when and by whom changes to the workspace have been made, the query to include this metadata to be included in the corresponding summary.

Item 3. The system of Item 1, wherein the query is further based on metadata specifying any of organization information, relationships among users, and related projects.

Item 4. The system of Item 1, further comprising a number of filters for the list of changes, wherein the number of filters remove changes from the list of changes prior to structuring of the query.

Item 5. The system of Item 1, wherein the programming instructions further cause the processor to sort the list of changes prior to structuring of the query.

Item 6. The system of Item 1, wherein the programming instructions further cause the processor to merge adjacent changes together prior to structuring of the query.

Item 7. The system of Item 1, wherein the programming instructions further cause the processor to structure the query based on an identified scenario comprising one of: (1) a summary of changes made over a specified period of time; (2) a summary of changes made in an editing session; and (3) a summary of content in the workspace.

Item 8. The system of Item 1, wherein the programming instructions further cause the processor to:
divide the list of changes into multiple batches and to structure a query for each batch; and
submit the query for each batch to the LLM or AI engine and receive a corresponding batch summary.

Item 9. The system of Item 8, wherein the programming instructions further cause the processor to combine multiple batch summaries to produce an overall summary for the user.

Item 10. The system of Item 9, wherein the programming instructions further cause the processor to combine the multiple batch summaries by submitting a query based on the multiple batch summaries to the LLM or AI engine with a request for the overall summary.

Item 11. The system of Item 1, wherein the programming instructions further cause the processor to map specific items in the summary to corresponding changes in the workspace and provide the map via the user interface.

Item 12. The system of Item 1, wherein the programming instructions further cause the processor to, in response to a triggering event, prompt the user via the user interface to initiate the query.

Item 13. The system of Item 1, wherein the programming instructions are incorporated in a plug-in or add-in.

Item 14. A non-transitory computer-readable medium comprising programming instructions for execution by a processor, the instructions, when executed, causing the processor to:
- access an electronic workspace in cloud storage using a network interface;
- determine a list of changes to the workspace within a period of time;
- structure a query to a Large Language Model (LLM) or Artificial Intelligence (AI) engine, the query to generate for a user a summary of the changes;
- obtain a corresponding summary from the LLM or AI engine; and
- in a user interface, associate a display of the workspace with the corresponding summary to update a user as to a current state of the workspace.

Item 15. The non-transitory computer readable medium of Item 14, wherein the workspace comprises metadata capturing a record of when and by whom changes to the workspace have been made, the query to include this metadata to be included in the corresponding summary.

Item 16. The non-transitory computer readable medium of Item 14, wherein the programming instructions further cause the processor to:
- sort the list of changes prior to structuring of the query;
- merge adjacent changes together prior to structuring of the query;
- divide the list of changes into multiple batches and to structure a query for each batch; and
- submit the query for each batch to the LLM or AI engine and receive a corresponding batch summary.

Item 17. The non-transitory computer readable medium of Item 16, wherein the programming instructions further cause the processor to combine multiple batch summaries to produce an overall summary for the user.

Item 18. A method of tracking development in an electronic workspace that is shared by multiple users, the method comprising, with a processor of a user device:
- accessing an electronic workspace in cloud storage using a network interface;
- determining a list of changes to the workspace within a period of time;
- structuring a query to a Large Language Model (LLM) or Artificial Intelligence (AI) engine, the query to generate for a user a summary of the changes;
- obtaining a corresponding summary from the LLM or AI engine; and
- in a user interface, associating a display of the workspace with the corresponding summary to update a user as to a current state of the workspace.

Item 19. The method of Item 18, wherein the workspace comprises metadata capturing a record of when and by whom changes to the workspace have been made, the query to include this metadata to be included in the corresponding summary.

Item 20. The method of Item 18, further comprising:
- sorting the list of changes prior to structuring of the query;
- merging adjacent changes together prior to structuring of the query;
- dividing the list of changes into multiple batches and to structure a query for each batch; and
- submitting the query for each batch to the LLM or AI engine and recieving a corresponding batch summary.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
 a processor;
 a network interface; and
 a memory comprising programming instructions for execution by the processor to:
  access an electronic workspace;
  determine a list of changes to the workspace within a period of time;
  structure a query to a Large Language Model (LLM) or Artificial Intelligence (AI) engine, the query to generate for a user a summary of the changes;
  obtain a corresponding summary from the LLM or AI engine; and
  in a user interface, associate a display of the workspace with the corresponding summary to update a user as to a current state of the workspace;
 wherein the programming instructions further cause the processor to sort the list of changes prior to structuring of the query, merge adjacent changes together prior to structuring of the query, divide the list of changes into multiple batches to structure a query for each batch, submit the query for each batch to the LLM or AI engine and receive a corresponding batch summary.

2. The system of claim 1, wherein the workspace comprises metadata capturing a record of when and by whom changes to the workspace have been made, the query to include this metadata to be included in the corresponding summary.

3. The system of claim 1, wherein the query is further based on metadata specifying any of organization information, relationships among users, and related projects.

4. The system of claim 1, further comprising a number of filters for the list of changes, wherein the number of filters remove changes from the list of changes prior to structuring of the query.

5. The system of claim 1, wherein the programming instructions further cause the processor to structure the query based on an identified scenario comprising one of: (1) a summary of changes made over a specified period of time; (2) a summary of changes made in an editing session; and (3) a summary of content in the workspace.

6. The system of claim 1, wherein the programming instructions further cause the processor to combine multiple batch summaries to produce an overall summary for the user.

7. The system of claim 6, wherein the programming instructions further cause the processor to combine the multiple batch summaries by submitting a query based on the multiple batch summaries to the LLM or AI engine with a request for the overall summary.

8. The system of claim 1, wherein the programming instructions further cause the processor to map specific items in the summary to corresponding changes in the workspace and provide the map via the user interface.

9. The system of claim 1, wherein the programming instructions further cause the processor to, in response to a triggering event, prompt the user via the user interface to initiate the query.

10. The system of claim 1, wherein the programming instructions are incorporated in a plug-in or add-in.

11. A non-transitory computer-readable medium comprising programming instructions for execution by a processor, the instructions, when executed, causing the processor to:
 access an electronic workspace in cloud storage using a network interface;
 determine a list of changes to the workspace within a period of time;
 structure a query to a Large Language Model (LLM) or Artificial Intelligence (AI) engine, the query to generate for a user a summary of the changes;
 obtain a corresponding summary from the LLM or AI engine; and
 in a user interface, associate a display of the workspace with the corresponding summary to update a user as to a current state of the workspace;
 wherein the programming instructions further cause the processor to:
  sort the list of changes prior to structuring of the query;
  merge adjacent changes together prior to structuring of the query;
  divide the list of changes into multiple batches and to structure a query for each batch; and
  submit the query for each batch to the LLM or AI engine and receive a corresponding batch summary.

12. The non-transitory computer-readable medium of claim 11, wherein the workspace comprises metadata capturing a record of when and by whom changes to the workspace have been made, the query to include this metadata to be included in the corresponding summary.

13. The non-transitory computer-readable medium of claim 11, wherein the programming instructions further cause the processor to combine multiple batch summaries to produce an overall summary for the user.

14. A method of tracking development in an electronic workspace that is shared by multiple users, the method comprising, with a processor of a user device:
 accessing an electronic workspace in cloud storage using a network interface;
 determining a list of changes to the workspace within a period of time;
 structuring a query to a Large Language Model (LLM) or Artificial Intelligence (AI) engine, the query to generate for a user a summary of the changes;
 obtaining a corresponding summary from the LLM or AI engine;
 in a user interface, associating a display of the workspace with the corresponding summary to update a user as to a current state of the workspace;
 sorting the list of changes prior to structuring of the query;
 merging adjacent changes together prior to structuring of the query;
 dividing the list of changes into multiple batches and to structure a query for each batch; and
 submitting the query for each batch to the LLM or AI engine and receiving a corresponding batch summary.

15. The method of claim 14, wherein the workspace comprises metadata capturing a record of when and by whom changes to the workspace have been made, the query to include this metadata to be included in the corresponding summary.

* * * * *